Feb. 5, 1952 A. B. BAILEY 2,584,532

MODULATION SYSTEM

Filed March 12, 1948 3 Sheets-Sheet 1

Inventor
ARNOLD B. BAILEY

By Blair, Curtis & Hayward.
Attorneys

MODULATION SYSTEM

Filed March 12, 1948 3 Sheets-Sheet 2

Inventor
ARNOLD B. BAILEY

By

Blair, Curtis & Hayward.
Attorneys

Feb. 5, 1952

A. B. BAILEY

MODULATION SYSTEM 2,584,532

Filed March 12, 1948

3 Sheets-Sheet 3

INVENTOR
ARNOLD B. BAILEY
BY
Blair, Curtis & Hayward
ATTORNEYS

Patented Feb. 5, 1952 2,584,532

UNITED STATES PATENT OFFICE 2,584,532

MODULATION SYSTEM

Arnold B. Bailey, Scotch Plains, N. J.

Application March 12, 1948, Serial No. 14,585

2 Claims. (Cl. 332—23)

The present invention relates to the modulation of electrical signals. More particularly it relates to methods of and apparatus for producing frequency modulated radio waves.

In wireless transmission systems, for example, radio broadcasting, high frequency electrical energy is applied to a transmitting antenna and the electrical waves radiated thereby are propagated through space so that their presence may be detected at a remote location by suitable radio receiving equipment.

In order to utilize the radio waves for the transmission of sound signals, or other information, it is necessary that some characteristic of the wave be modified in accordance with the waveform and intensity of the sound signals which are to be transmitted. The process of changing the characteristics of a radio wave, in accordance with the information to be transmitted, is termed modulation. For example, it is possible to modify the amplitude of a radio frequency signal in accordance with the waveform of sound waves while maintaining the frequency of the radio signal constant. This is termed "amplitude" modulation and is the method used by ordinary commercial broadcast stations.

In another system the amplitude is held constant and the frequency of the radio signal is varied in accordance with the sound waves which are to be transmitted. This process is termed frequency modulation and is used widely in higher frequency transmission systems. Such frequency modulation transmission systems have many advantages over amplitude modulation systems. One important advantage is the marked reduction in the noise level. In other words, with frequency modulation, undesirable background sounds such as continuous crackling or hissing, or static disturbances such as are caused by lightning, are reduced.

In practice, frequency modulation has been difficult to obtain. For example, the center frequency, that is, the frequency about which the modulated signal varies during modulation, must be maintained constant with great precision. In addition, the extent of the frequency variation or swing produced by the modulation must be relatively large in order to obtain the best performance. These and other requirements are difficult to fulfill with the result that the transmitters now in use generally are complex and require a great number of vacuum tubes and associated parts. In one aspect, the present invention is concerned with simplified methods and apparatus for producing frequency modulated signals.

Accordingly, it is an object of this invention to provide improved methods and apparatus for frequency modulating a radio frequency carrier wave.

It is another object to provide simplified apparatus for producing such a frequency modulated signal.

Another object is to improve the frequency stability of such a modulation system.

Still another object of the invention is to provide improved methods of and apparatus for the stabilization of electrical signals in apparatus subjected to varying supply voltages.

It is a further object to provide such a stabilized system in which the audio modulation signals produce a large extent of frequency change in the radio signals in accordance with the waveform and intensity of the audio signals.

Another object is to provide such a system in which a quartz crystal, or the like, is utilized to provide frequency stability and yet permit adequate frequency modulation in accordance with applied audio or control signals.

The invention, accordingly, consists in the features of construction, combinations of elements, arrangements of parts and methods of operations as will be exemplified in the structures and sequences and series of steps to be hereinafter indicated and the scope of the application of which will be set forth in the appended claims.

The above and other objects and advantages of the present invention will appear more fully from a consideration of the detailed description which follows, taken together with the accompanying drawings in which.

Figure 1:
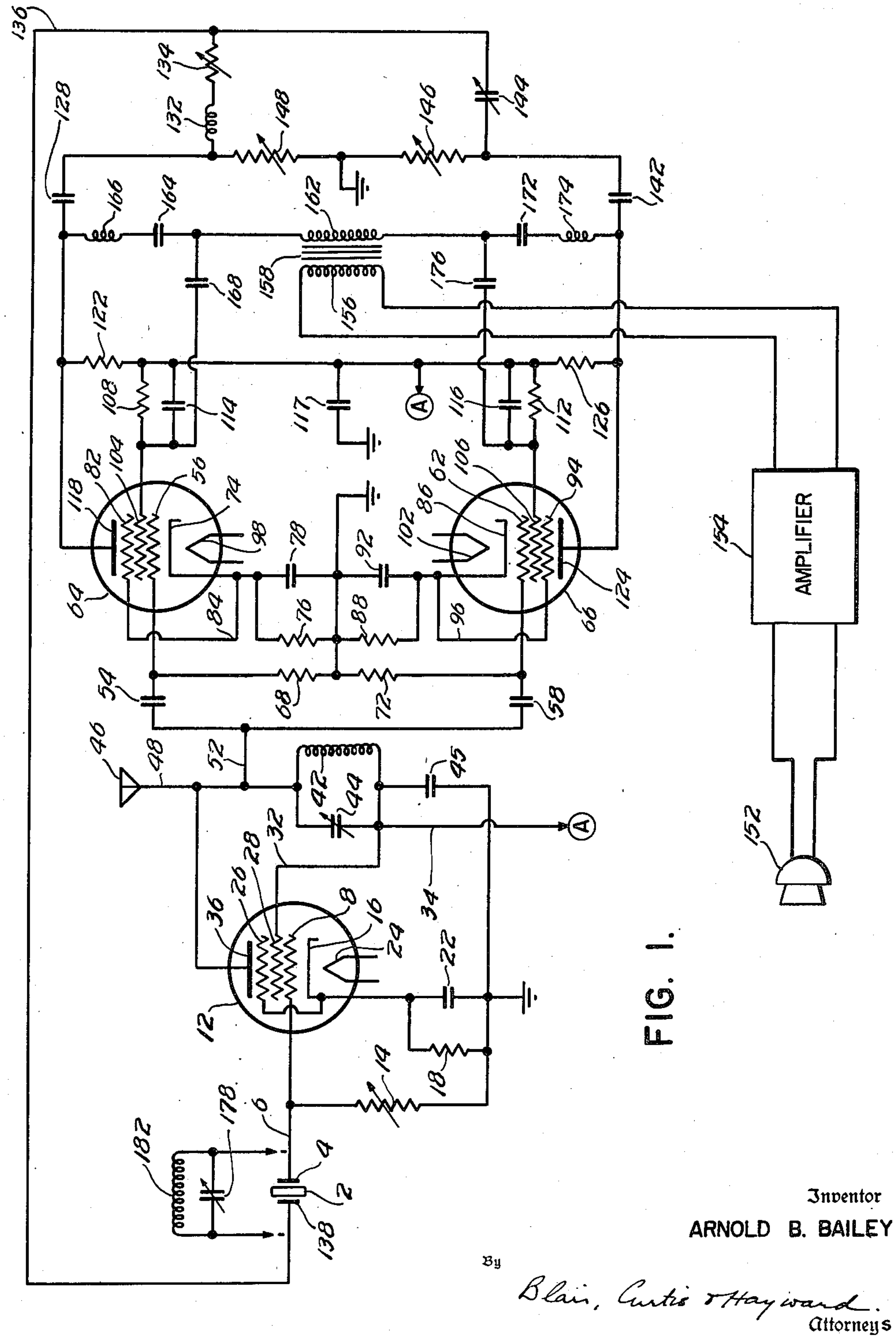
Fig. 1 is a circuit diagram of a simplified frequency modulated oscillator embodying the principles of the present invention.

In order to provide a stabilized frequency modulation circuit, a quartz crystal 2 (Fig. 1) is utilized to control the center frequency and is operated in a series resonant manner. A crystal electrode 4 is connected by a lead 6 to a control grid 8 of a pentode vacuum tube 12; a direct current ground return path being provided through an adjustable resistance element 14. A cathode 16 of this tube is connected to ground through a bias resistor 18 which is shunted by a condenser 22. Heater 24 of this tube is connected to a suitable source of power (not shown). A suppressor grid 26 is connected internally to cathode 16. Screen grid 28 of tube 12 is connected by leads 32 and 34 to a suitable power source A (not shown). Anode 36 of this tube is connected by means of a lead 38 to a parallel resonant circuit comprising an inductance 42 and an adjustable capacitor 44. Positive voltage is provided for anode 36 from power source A through lead 34, inductance 42, and lead 38. A lead, illustrated diagrammatically by an antenna 46, is coupled directly to anode 36 by a lead 48.

The anode circuit of tube 12 is coupled also through lead 52 and condenser 54 to control grid 56 of a pentode tube 64, and through a condenser 58 to control grid 62 of a similar tube 66. Ground return paths for grids 56 and 62 are provided by resistors 68 and 72, respectively. Cathode 74 of tube 64 is connected to ground through a bias resistor 76 which is shunted by a capacitor 78. Suppressor grid 82 of this tube is connected to cathode 74 by a lead 84. Cathode 86 of tube 66 is connected to ground through a bias resistor 88 which is shunted by a capacitor 92. Suppressor grid 94 of this tube is connected to cathode 86 by a lead 96. Heaters 98 and 102 of tubes 64 and 66, respectively, are connected to a suitable power source (not shown). Positive voltage is provided for screen grids 104 and 106 of tubes 64 and 66, respectively, from power source A through series dropping resistors 108 and 112, respectively. Screen grids 104 and 106 are coupled to power source A through radio frequency bypass condensers 114 and 116, respectively; power source A being coupled to ground by a condenser 117. Anode 118 of tube 64 is connected to power source A through a load resistor 122, and anode 124 of tube 66 is coupled to power source A through a load resistor 126.

The signal appearing at anode 118 of tube 64 is coupled through a condenser 128, an inductance 132, an adjustable resistor 134, and a lead 136 to crystal electrode 138 of the crystal 2. The signal appearing at anode 124 of tube 66 is coupled through a coupling condenser 142, which is similar to condenser 128, and an adjustable capacitance 144 to lead 136.

The arrangement described above operates as a radio frequency oscillator in which the radio frequency energy is fed back from the output circuit of tubes 64 and 66 through crystal 2, which, in this example, is series resonant near the center of the frequency range of the oscillator, to the input of tube 12. The signals are amplified in tube 12 and the operation of crystal 2 within the correct frequency range is maintained by the parallel circuit (which is resonant at the signal frequency and includes inductance 42 and capacitance 44) in the anode circuit of tube 12. The amplified radio frequency signal from tube 12 is divided and applied (in phase, in this example) to the control electrodes of tubes 64 and 66, respectively. The output of tube 64 is coupled through the inductance 132, which is effectively in series with crystal 2, back to the input circuit. In a similar manner, the output from tube 66 is coupled to the input circuit through a condenser 144, which is adjusted to have a capacitive reactance numerically equal to the inductive reactance of inductance 132 at or near the center frequency of operation.

Thus, if the transconductance of tube 64 is equal to that of tube 66, equal signal currents are produced in the anode circuits because identical signals are applied to the control grid 56 and 62 of these tubes. The inductive effect of inductance 132 is compensated by the capacitive reactance effect of condenser 144.

In order to observe the effect on the circuit when the transconductances of tubes 64 and 66 are not identical assume that tube 64 is biased to cut-off so that no signal appears on the anode 118 and full signal appears on anode 124 of tube 66. The condenser 144 now introduces a capacitive reactance in the only feed-back circuit which is active. This phase shift in the feed-back circuit causes the circuit to generate a frequency above the center frequency.

If, however, tube 66 is biased so that it does not draw plate current and tube 64 is allowed to draw full plate current, the signal appearing at anode 118 of tube 64 is fed back to the crystal 2 through inductance 132, thus introducing an inductive reactance in the only active feed-back circuit to cause the oscillatory circuit to generate a lower frequency.

In operation of this embodiment, neither of the tubes 64 or 66 is driven to cut-off condition, but the transconductances are caused to vary in accordance with the desired modulating signal. For example, if it is desired to modulate the radio frequency signal with audio signals, modulation voltages may be applied, in phase opposition, to tubes 64 and 66. The circuit illustrated in Fig. 1 is adapted to apply plate and screen modulation to these tubes.

The sound signals, which are to be impressed on the carrier, are translated into electrical signals by a microphone 152 and amplified in a conventional type audio amplifier 154, the output of which is coupled to a primary winding 156 of a modulation transformer 158. One end of secondary winding 162 of transformer 158 is coupled to anode 118 of tube 64 through condenser 164 and a radio frequency choke 166, and to screen 104 of the same tube through a condenser 168. The opposite end of secondary winding 162 is coupled to anode 124 of tube 66 through a condenser 172 and a radio frequency choke 174, and to screen 106 of this tube through a condenser 176. During modulation the audio signals are applied simultaneously, in phase opposition, to tubes 64 and 66. Thus, as the feed-back current through inductance 132 increases, because of an increase in signal current from tube 64, the feed-back current through capacitance 144 decreases, because of a decrease in the signal current from tube 66, the two effects operate to lower the frequency of the generated signal; whereas during those portions of the signal when feed-back current through condenser 144 is increased, the feed-back current through inductance 132 is decreased thereby increasing the frequency of the generated signal. In this manner, the frequency of the radio signal appearing on lead 48 varies in accordance with the applied audio frequency signals. For medium or low frequency operation and for narrow-band frequency modulation transmission systems, the signals appearing on lead 48 may be coupled directly to the antenna 46, or they may be amplified prior to transmission. Where higher frequency operation with correspondingly greater frequency swing is desired, conventional multipliers may be utilized as necessary.

It is to be noted that modulation signals to be effective must be applied in phase opposition to the tubes 64 and 66. This characteristic is important from the standpoint of frequency stability; thus, if the plate and the screen voltages of tubes 64 and 66 are increased or decreased simultaneously, the center frequency remains relatively constant because of the compensating effects of inductance 132 and capacitance 144, and because of the inherent voltage stability of the circuit as a whole.

The index of modulation, that is the extent of the frequency swing with a given audio signal, depends upon the magnitudes of the reactances of condenser 144 and inductance 132 and upon the frequency of operation. The characteristics of the crystal and of its electrodes also affect the extent of the frequency swing which may be obtained.

The limitation on frequency swing caused by the nearness of the parallel resonant frequency (anti-resonant frequency) of the crystal to its series resonant frequency may be overcome substantially by placing a parallel circuit, comprising a condenser 178 and an inductance 182, in shunt with the crystal; the combined crystal circuit being resonant at the center operating frequency.

It is apparent that the present invention has utility for purposes other than transmission of audio signals. For example, the transconductances of tubes 64 and 66 may be controlled by the application of direct control voltages to control grids 62 and 56, respectively, so that the generated signal may be caused to vary in accordance with these DC control potentials. Because of the stabilization characteristics of the tubes and circuit arrangement and because modulation control is readily applied, the arrangement is well suited for use in multiplex transmission systems in which the carrier is shifted a given amount by a keying action in accordance with the applied signals.

Suitable values for use in the arrangement shown in Fig. 1 are given in the following table:

*Tubes*

| Number | Type |
|---|---|
| 12 | 6V6 |
| 64 | 6AC7 |
| 66 | 6AC7 |

*Resistance elements*

| Number | Value In Thousands of Ohms |
|---|---|
| 14 | 1.0 |
| 18 | 0.3 |
| 68 | 100. |
| 72 | 100. |
| 76 | 0.3 |
| 88 | 0.3 |
| 108 | 50. |
| 112 | 50. |
| 122 | 5. |
| 126 | 5. |
| 134 | 1.0 |
| 146 | 1.0 |
| 148 | 1.0 |

*Capacitance elements*

| Number | Value In Microfarads |
|---|---|
| 22 | 0.01 |
| 44 | 0.001 |
| 45 | 0.01 |
| 54 | 0.003 |
| 58 | 0.003 |
| 78 | 0.01 |
| 92 | 0.01 |
| 114 | 0.002 |
| 116 | 0.002 |
| 128 | 0.000025-0.002 |
| 142 | 0.000025-0.002 |
| 144 | 0.00005 |
| 164 | 1.0 |
| 168 | 1.0 |
| 172 | 1.0 |
| 176 | 1.0 |

The quartz crystal 2, for example in this embodiment, may be resonant at about 4 megacycles and is a conventional type such as are used ordinarily for frequency control purposes. However, operation may be improved for these special applications by judicious choice of electrode sizes, shapes, and placement, and by loading the surfaces of the crystal.

Figure 2:
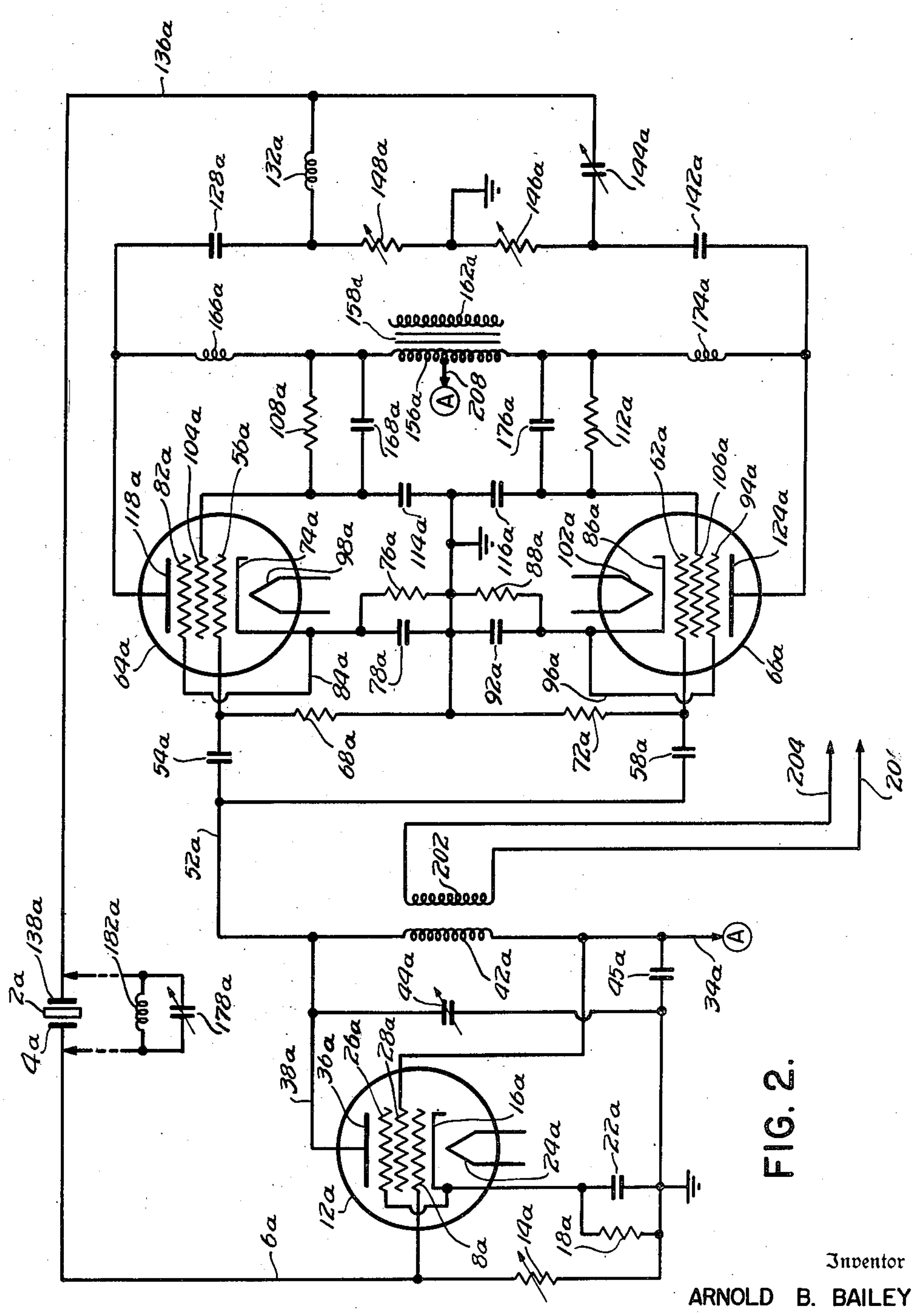
Fig. 2 is a modification of the circuit shown in Fig. 1.

Fig. 2 shows a slightly different embodiment of the circuits shown in Fig. 1 and which is adapted to be coupled to conventional equipment for multiplying and amplifying the signal produced by the oscillator so that the radiated signal may have the desired center frequency and extent of modulation.

An output coil 202 is coupled to inductance 42a in the anode circuit of tube 12a and is coupled through leads 204 and 206 to the desired multiplying or amplifying circuits (not shown).

In this example, the system for modulating tubes 64a and 66a is slightly different from that shown in Fig. 1; the plate and the screen voltages for tubes 64a and 66a being applied to anode and screen grids of these tubes through a center tap connection 208 of winding 156a of transformer 158a. The basic operation, however, of the circuit remains the same as that described in connection with Fig. 1.

It is apparent that many changes and modifications may be made in the above described system, in order to adapt it to various functions and applications, without departing from the scope or spirit of the invention. For example, other elements may be substituted for the crystal 2 and endless varieties of modulation circuits and methods of application may be devised. The resonant circuit comprising inductance 42 and condenser 44 may be replaced by a pre-tuned band pass filter having any desired number of sections and characteristics.

Figure 3:
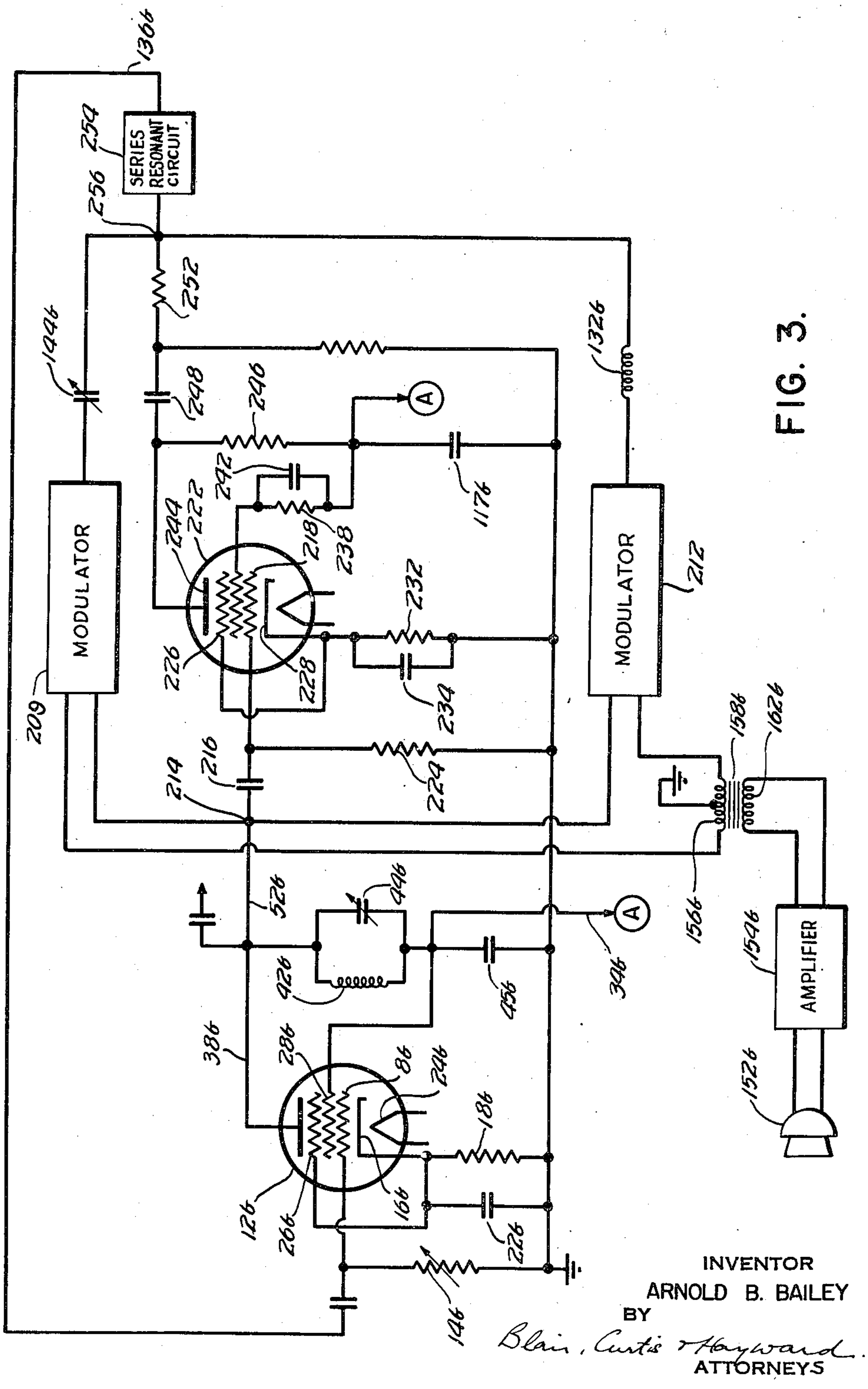
Fig. 3 shows, partially in block diagram form, apparatus including an additional channel for increasing the stabilization.

Fig. 3 shows another modulated signal generator in which the feed-back current comprises three components: a first component from modulator circuit 209 (which is similar to tube 66 with its associated circuits) through phase shift condenser 144b; a second component from modulator circuit 212 (similar to tube 64 with its associated circuits) through phase shift inductance 132b; and a third component in which no modulation is effected and which provides a stabilizing influence on the circuit.

The signal from tube 12b and the associated components, which are similar to the corresponding components and tube 12 of Fig. 1, is divided at point 214 and applied to modulator circuits 209 and 212, and through condenser 216 to control grid 218 of tube 222. A ground return for grid 218 is provided by a resistor 224. Suppressor grid 226 of this tube is connected to ground through bias resistor 232 which is in shunt with a condenser 234.

Screen grid 236 of tube 222 is connected to power source A through a series resistance 238, which is in parallel with a condenser 242. Anode 244 is connected to power source A through a load resistor 246.

No modulation signal is applied to tube 222 so that the circuit amounts to a "straight through" amplifier the output signals from which are applied through a condenser 248 and resistance 252 to a resonant circuit 254.

The modulation signals from transformer 158b are applied, in phase opposition, to modulator circuits 209 and 212, and control the instantaneous signal output from these circuits.

The output signals from these circuits are combined with the signals from tube 222 at point 256.

The resonant circuit 254 may comprise a crystal arrangement such as is shown in Fig. 1 or it may comprise other forms of resonant circuits such as combinations of inductances and capacitances, bridge circuits, magnetostrictive coupling arrangements and so forth.

The feed-back signal from circuit 254 is applied to the input circuit of tube 126 to thereby generate a signal having a frequency dependent upon the relative instantaneous magnitudes of the three components of the feed-back signal.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In a transmission system, the method of producing a frequency modulated signal comprising the steps of amplifying a first signal, dividing said signal into at least two components, oppositely shifting the instantaneous phase of at least two of said components relative to each other, varying the magnitude of the shifted components in accordance with an applied modulation signal, passing said components along a common path, differentially impeding the flow of said components along said common path, the impeding being least substantially at the center of the frequency range covered by said signal components, and combining the resulting signal with said first signal and reamplifying it therewith.

2. In a frequency modulation system, a main amplifier having output and input circuits, a first and a second feed-back amplifier each having an input and an output circuit, said input circuits of said feed-back amplifiers being coupled to said output circuit of said main amplifier, a series circuit resonant within the operating frequency range and coupled to the input circuit of said main amplifier and to the output circuit of said first feed-back amplifier through a capacitive element and to the output circuit of said second feed-back amplifier through an inductive element, said inductive and capacitive elements having substantially equal reactance values at one frequency within the operating frequency range, and a source of control voltage coupled to said feed-back amplifiers for controlling the instantaneous signal output thereof in accordance with the magnitude of said control voltage.

ARNOLD B. BAILEY.

REFERENCES CITED

The following references are of record in the file of this patent:

UNITED STATES PATENTS

| Number | Name | Date |
|---|---|---|
| 2,342,708 | Usselman | Feb. 29, 1944 |
| 2,347,458 | Brown | Apr. 25, 1944 |
| 2,399,268 | Usselman | Apr. 30, 1946 |
| 2,440,622 | Usselman | Apr. 27, 1948 |
| 2,459,557 | Usselman | Jan. 18, 1949 |
| 2,463,661 | Usselman | Mar. 8, 1949 |